United States Patent [19]

Kay et al.

[11] Patent Number: 4,739,037

[45] Date of Patent: Apr. 19, 1988

[54] FINE GRINDING GUAYULE SHRUB-SOLVENT SLURRY

[75] Inventors: Edward L. Kay, Akron; Richard Gutierrez, Canal Fulton, both of Ohio

[73] Assignee: The Firestone Tire & Rubber Company, Akron, Ohio

[21] Appl. No.: 607,478

[22] Filed: May 7, 1984

[51] Int. Cl.$^4$ ............................ C08C 4/00; C08C 2/02
[52] U.S. Cl. .................................... 528/493; 528/494; 528/495; 528/496; 528/930
[58] Field of Search ............... 528/491, 493, 494, 495, 528/496, 497, 498, 930

[56] References Cited

U.S. PATENT DOCUMENTS

| 2,390,860 | 12/1945 | Williams | 260/817 |
| 2,572,046 | 10/1951 | Meeks et al. | 260/476 |
| 4,136,131 | 1/1979 | Buchanan | 260/816 |
| 4,405,532 | 9/1983 | Gutierrez | 524/253 |
| 4,435,337 | 3/1984 | Kay | 528/493 |

Primary Examiner—Christopher Henderson
Attorney, Agent, or Firm—Daniel N. Hall

[57] ABSTRACT

A process for achieving a high yield of rubber and/or resin from rubber containing plants such as guayule plants by crushing the plants, forming a slurry with a solvent and fine grinding said slurry with a high shear mixer. The time required by the process is very short in comparison with prior art techniques.

15 Claims, No Drawings

FINE GRINDING GUAYULE SHRUB-SOLVENT SLURRY

TECHNICAL FIELD

The present invention relates to extracting a high percentage of rubber and/or resin from rubber containing plants by utilizing a high shear mixer. More specifically, the present invention relates to recovering high percentages of rubber and/or resin by forming a slurry of crushed rubber containing plants such as guayule plants with a monophase solvent and then grinding under high shear conditions.

BACKGROUND ART

Heretofore, rubber was recovered from guayule plants by the water flotation process which involved parboiling the shrub to help coagulate the latex and minimize loss of latex during wet milling of the shrub in a pebble mill. The parboiling also aided in removal of dirt and leaves. The crude rubber would be recovered via a water flotation process which involved allowing the crude rubber to float on the surface of the water and subsequently collecting the crude rubber by various means.

An improved method involved the fine grinding of a water slurry containing rough ground guayule as ground in a pulping mill to rupture a greater percentage of the cells containing the rubber latex with recovery of crude rubber by the water flotation process. However, the efficiency of the water flotation process does vary with the variety of guayule shrub used as well as the general condition of the shrub. Hence, yield of rubber will vary over a considerable range. In addition, fine grinding in a pulping mill so effectively released the rubber and coagulated the rubber that at times the grinding plates were fouled.

To overcome the variability of the efficiency of the water flotation process, attempts were made to treat the crushed guayule shrub with solvents to effect dissolution of the rubber or resin with subsequent recovery of the rubber or resin from the respective solution. These attempts involved percolation which involved passage of solvent through a bed of guayule shrub to remove the desired rubber by dissolution. Guayule resin can be efficiently recovered by solvent percolation; however, because of the high viscosity of the rubber solution, percolation by gravity flow rapidly compacted the bed of ground shrub resulting in failure of the gravity percolation process.

Still another method of recovering the rubber or resin involved subjecting the plant materials to a simultaneous action of compressive and shear forces under nonaqueous conditions, wherein said forces are sufficient to reduce said fiberous plant material to comminuted fiberous matter and, thereby, release polymeric hydrocarbon substances. The comminuted fiberous matter and polymeric hydrocarbon substances would cohere into a plastic mass. The plastic mass was then shaped into particles, and polymeric hydrocarbon substances extracted therefrom with a solvent. However, this method, as set forth in U.S. Pat. No. 4,136,131 related to open milling of the guayule shrub as well as size reduction in an extruder and thus would expose the ground shrub to the deleterious effects of air contact unless the operations are conducted in an inert atmosphere.

Moreover, this procedure to form preshaped particles of comminuted guayule shrub involved an additional step since the preshaped particles are then extracted via a percolation process.

Many variations of the percolation and immersion processes are possible but no known previous procedure reports the simultaneous recovery of rubber and resin via dissolution in an appropriate solvent.

Another method of recovering rubber or resin was to immerse the crushed guayule shrub in a solvent to effect dissolution and subsequently recovering the solution of rubber or solution of resin. This procedure would avoid the compacting of the shrub bed experienced with solvent percolation to recover rubber. This procedure is commonly called an immersion process.

U.S. Pat. No. 2,390,860 relates to using for extraction a resin solvent as a resin solvent with a small amount of a rubber solvent such that the mixture is not a rubber solvent. This patent is not pertinent in that it relates to using a material obtained via a water floatation process. U.S. Pat. No. 2,572,046 relates to an extraction method having a separate water-miscible, organic solvent phase, and a separate hydrocarbon solvent phase. Hence, in relating to two different phases, it is not pertinent. None of these patents suggests the use of a monophase mixture of solvents, or to the formation of a slurry therewith and the fine grinding thereof.

DISCLOSURE OF THE INVENTION

It is therefore an aspect of the present invention to provide a method for fine grinding rubber containing plants such as guayule plants and obtain a high recovery yield of rubber and/or resin.

It is a further aspect of the present invention to provide a method for fine grinding guayule plants as above wherein said guayule plants are crushed into particles and formed into a slurry by the addition of solvent thereto.

It is yet another aspect of the present invention to provide a method for fine grinding guayule plants, as above, wherein a high shear grinding step is utilized and fouling of the high shear grinding is eliminated and exposure to the deleterious effects of air is minimized.

It is still another aspect of the present invention to provide a method for fine grinding guayule plants, as above, wherein the recovery yield of rubber and/or resin is 70 percent or greater.

It is a still further aspect of the present invention to provide a method for fine grinding guayule plants, as above, wherein a monophase solvent is utilized.

These and other aspects of the present invention will become apparent from the disclosure which describes in detail the present invention.

In general, a process for the fine grinding of rubber containing plants, comprising the steps of:

preliminary crushing the rubber containing plant;

adding a monophase solvent to said crushed rubber containing plant and forming a slurry;

fine grinding said slurry to an extent such that a recovery yield of at least 70 percent of the total resin and/or rubber in said plant is obtained, and separating said resin and rubber solution from said slurry.

BEST MODE FOR CARRYING OUT THE INVENTION

According to the concepts of the present invention, a high yield of rubber and/or resin is obtained by fine grinding under high shear rubber containing plants such as guayule in the presence of a monophase solvent, that is, a solvent containing at least one hydrocarbon solvent or at least one organic polar solvent, or combinations thereof.

The initial step after obtaining the guayule plant or other rubber bearing shrubs, plants, trees and the like is to crush cut the plant into small pieces. Various conventional apparatus can be utilized such as a hammer mill, and the like. Generally, the hammer mill process is such that the particle size is rather small, as for example above less than 1.0" and usually usually ¼" in length.

A suitable crush grinding step can involve the use of a double stage hammer mill such that the particles egressing from the first hammer are fed to the second hammer mill. The entire plant can be fed whole, that is with leaves thereon, to the mill. This has the advantage of recovering the resin and waxes in the leaves.

To the hammer milled or other suitably crushed shrubs or plants is then added a liquid monophase solvent. By monophase is meant that the solvent system at the temperature of extraction and the proportion employed is a single phase. In other words, the constituent solvents are miscible under these conditions. Suitable solvents for rubber include alkanes having from 4 to 9 carbon atoms with hexane being preferred. Other solvents for rubber include the cycloalkanes and alkylcycloalkanes having from 5 to 10 carbon atoms such as cyclohexane, cyclopentane, methyl ethyl cyclohexane, and the like. The aromatics or alkyl substituted aromatics having from 6 to 12 carbon atoms, such as benzene, toluene, xylene and the like can also be utilized.

The organic polar solvents for guayule resin include the ketones having from 3 to 8 carbon atoms such as acetone, methyl ethyl ketone, and the like.

Also, esters having from 3 to 8 carbon atoms can be used as can alcohols having from 1 to 8 carbon atoms, or formates, acetates, propionates, etc., of such alcohols. Moreover, ethers having from 2 to 8 carbon atoms can also be used such as dimethyl ether, diethyl ether, etc., cyclic ethers of 4 to 8 carbon atoms such as tetrahydrofuran, and the like.

Solvents which are preferred include hexane, acetone, and combinations thereof. When used together, that is for the simultaneous extraction of rubber and resin, the amount of polar solvent is from about 5 to about 50 percent by weight and desirably from about 10 to about 40 percent by weight. The corresponding amount of hydrocarbon solvent is from about 50 percent to about 95 percent by weight and desirably from about 60 to about 90 percent by weight.

The amount of solvent by weight added to the chopped shrubs generally ranges from about 100 to about 1 and preferably from about 10 to about 1 times the weight of shrub. Generally the bulk density of the shrub varies with particle size; therefore, sufficient solvent should be added to the crushed shrub to provide a fluid slurry.

After forming the slurry, the next step is to fine grind under high shear the chopped plant materials in the slurry. Since the rubber, is generally located within the cells of the plant, the cells must generally all be effectively ruptured. Hence, a fine grinding mill or mixer is utilized as for example a pulping mill or a two roll mill. A more desirable mill would be a mill such as a pulping mill which has one stationary disc and one rotating disc or two counter rotating discs with the provision that an inert atmosphere can be maintained in the grinding area. The disc may have small apertures thereon to permit high shear to be applied to the chopped particles as well as to permit finely ground material to pass therethrough. Regardless of the type of mill, it is one in which high shear is imparted to the chopped plant particles and should desirably rupture all cells therein. Accordingly, the various parameters of the mill or grinder such as speed, grinding time, and the like can be varied such that a recovery yield of 70 percent or greater and desirably from 90 percent to 100 percent of the total rubber and/or resin is obtained. Since the chopped plant material is contained in a solvent and forms a slurry, simultaneous grinding as well as extraction therefrom is accomplished. The particle size of the finely ground material is 1/16" or less, and preferably between 0.001 to 0.05 inches.

The grinding step is generally carried out at moderate temperatures, that is from about 10° C. to about 60° C., or more preferably from about 20° C. to about 35° C.

The ground slurry can now be stored or purified. The optional storage step involves holding the ground slurry in a vessel such as a holding tank, or the like and allowing gravity separation of the micella from the bagasse, cork and dirt. That is, due to gravitational action, various impurities such as pulp, wood, dirt, bark and the like will settle to the bottom of the tank. The miscella (solvent of rubber and/or resin) may be withdrawn therefrom whenever desired. The miscella fraction from either the storage tank or the grinding step can be purified in any conventional manner. For example, it can be passed through a series of filters to remove any remaining small amount of bagasse, dirt, etc. Similarly, it can be centrifuged, etc.

There are several processing advantages derived from the present invention. Specifically, parboiling as well as defoliation of the shrub is not required. A desired ingredient, cuticle wax can be recovered.

Upon fine grinding, rapid dissolution of the resin and/or rubber is rapidly achieved. Moreover, fouling of the grinding plates with any aglomerated rubber is not experienced, but rather has been eliminated. Another distinct advantage of the present invention is that various strains of guayule shrub, e.g. Parthenium Argentatum species, which previously have not been efficiently processed by water flotation method are now readily processed with high yields. Such strains includes the following. Also, a brief description of the characteristics of the rubber (referred to as worms) released by the water floatation process and difficulties encountered in recovering the rubber is also presented.

| Strain D-65 | Buoyant but difficult to recover because of fineness |
| Strain D-118 | Difficult to skim after milling because of small size and average buoyancy |
| Strain D-153 | No worms of rubber appeared after milling one hour |
| Strain 42651 | Rubber was very buoyant and floated more readily than most |
| Strain D-155 | Indistinct rubber worms were small and difficult to handle |

| | |
|---|---|
| Strain-593 | Rubber worm exhibited normal characteristics |

Data from the Natural Rubber Research Station Final Report published in 1953.

Moreover, partially degraded shrubs, due to prolonged storage, can also be ground to recover useful products such as lower molecular weight rubber.

The use of solvent combinations to simultaneously extract the major portions of rubber and resin is particularly advantageous. This procedure eliminates the necessity of separate rubber and resin extraction steps. In addition, it should be noted that guayule resin is a very complex mixture of compounds some of which are sufficiently nonpolar to be easily dissolved in hexane. Therefore, if hexane is used to extract rubber in a separate step, some of the hexane-soluble resin fraction will be extracted with the rubber. That is, hexane extraction of shrub does not necessarily result in a resin-free rubber. The other alternative of acetone extraction of shrub could result in extraction of some low molecular weight rubber and/or some water-soluble material in the plant.

The use of a combination of solvents to simultaneously extract rubber and resin allows for the processing of a single solution to more easily recover purified rubber and resin without the relatively expensive procedure of treating two separate solutions to recover relatively pure product fractions.

Moreover, inherent within the present invention is the capability of adding effective stabilizers which can be added during storage to the guayule resin and/or rubber miscella.

The invention will be better understood by reference to the following examples.

EXAMPLE 1

To demonstrate the utility of our invention, we utilized "wild" guayule shrubs growing in Texas. By "wild" we mean that the shrub used was not defined as to exact variety. The shrub was allowed to dry to remove the bulk of the water present and then ground to a nominal ⅛" particle size in a hammer mill.

The hammer milled shrub was added to a Waring blender containing four blades sharpened to a "knife edge" to simulate the shear and cutting ability of a disc mill or pulping mill. The blender was powered by a ½ HP motor rated at 3450 rpm. To the blender was added a specific amount of shrub by weight as well as solvent as set forth in Table I. The slurry was ground in the blender for a time period set forth in Table I and then transferred to a storage vessel. The finely ground slurry was allowed to stand for at least one hour to ensure settling of the bagasse, etc., as well as to allow the supernatant liquid layer to clarify. The clarified liquid was then analyzed and the results set forth in Table I. As a control experiment, to determine the amount of product available for extraction present in the hammer milled shrub, an air stirrer having rounded-off edges was utilized to minimize additional grinding of the shrub. Specific amounts of the shrub was added along with solvent and mixed for a specific time as set forth in Table I, Sample No. 4. The amount of product was then determined in the same manner as utilized in analyzing the finely ground slurry.

TABLE I
SIMULTANEOUS FINE GRINDING, DERESINATION OF GUAYULE SHRUB: ACETONE SOLVENT, AMBIENT TEMPERATURES

| Sample No. | 1 | 2 | 3 | 4 |
|---|---|---|---|---|
| Shrub Wt. grams | 100.0 | 200.0 | 200.0 | 400.0 |
| Acetone Wt. grams | | | | |
| Initial | 500 | 1000 | 792 | 1584 |
| Final | 600 | 1097 | 1085 | 1833 |
| Grinding Time In Blender, Minutes | 0.50 | 2.50 | 5.00 | — |
| Wt. % Resin Extracted[1] After Blender Grinding | 70.3 | 86.7 | 87.5 | — |
| Wt. % Resin Extracted[2] After Mixing Sample with an Air Stirrer for Minutes: | | | | |
| 5 | — | — | — | 60.9 |
| 30 | 86.2 | 84.8 | 89.8 | 65.6 |
| 60 | — | — | — | 68.9 |

[1]Sample allowed to stand at least one hour prior to determination of resin in acetone solution.
[2]Samples No. 1, 2 and 3 were mixed with an air stirrer for 30 minutes after grinding in the blender, then allowed to stand overnight prior to determination of resin in acetone solution.

As apparent from Table I, good high recovery yields were obtained after a blending time of ½ minute. In comparison with a control Sample No. 4, high recovery yields were obtained in only a matter of minutes versus approximately ½ hour or more for the control. It should be reported that additional acetone was added to the slurry to give the final weight of acetone recorded. This was necessary to ensure that the resin that splashed on the sides of the blender was included in the final sample.

As recorded in Table I, the recovery yield of resin in the control (Sample No. 4) was 60.9, 65.6 and 68.9 percent after 5, 30 and 60 minutes air stirring, respectively. The result would indicate a slow progressive extraction due to the additional agitation of the stirrer. However, comparing the 70.3, 86.7 and 87.5 percent extraction results of Sample Nos. 1, 2 and 3 indicate that the shear-grinding in the blender effectively released the resin for dissolution in acetone.

EXAMPLE 2

In a manner similar to that used in Example 1, the simultaneous grinding of guayule shrubs and extraction of resinous guayule rubber with hexane was conducted. The data obtained is set forth in Table II.

TABLE II
SIMULTANEOUS FINE GRINDING, RESINOUS RUBBER EXTRACTION OF GUAYULE SHRUB HEXANE SOLVENT, AMBIENT TEMPERATURES

| Sample No. | 5 | 6 | 7 | 8 |
|---|---|---|---|---|
| Shrub Wt., grams | 100.0 | 200.0 | 200.0 | 400.0 |
| Hexane Wt., grams | | | | |
| Initial | 500 | 800 | 659 | 1647 |
| Final | 700 | 912 | 712 | 1652 |
| Grinding Time in Blender, Minutes | 0.50 | 2.50 | 5.00 | — |
| Wt. % Resinous Rubber Extracted[1] After Blender Grinding | 65.2 | 73.4 | 74.5 | — |
| Wt. % Resinous Rubber Extracted[2] After Mixing Sample With The Air Stirrer For Minutes: | | | | |
| 5 | — | — | — | 63.0 |
| 30 | 67.0 | 69.0 | 71.7 | 63.1 |

TABLE II-continued
SIMULTANEOUS FINE GRINDING, RESINOUS RUBBER
EXTRACTION OF GUAYULE SHRUB
HEXANE SOLVENT, AMBIENT TEMPERATURES

| Sample No. | 5 | 6 | 7 | 8 |
|---|---|---|---|---|
| 60 | — | — | — | 64.2 |

[1]Sample allowed to stand at least one hour prior to determination of resinous rubber in hexane solution.
[2]Samples No. 5, 6 and 7 were mixed with an air stirrer for 30 minutes after grinding in the blender then allowed to stand over night prior to determination of resinous rubber in hexane solution.

As apparent from Table II, high yields of resinous rubber were generally obtained within a small amount of mixing time, that is a minute or two. Moreover, the yield obtained was generally slightly higher than that obtained utilizing an air stirrer. In comparison with Example 1, the overall efficiencies are somewhat lower due to the relatively poor solubility of polar fractions of guayule resin in hexane. That is, the recovery yield was based on the recovery of both resin and rubber. Since some of the resin is not soluble in hexane; lower than 100 percent recoveries are expected. However, the difference in recovery yields of the blender-ground example and the control (Sample No. 8), should be the recovery of additional rubber. Thus, another test was conducted in a manner as set forth in Example 1 wherein an 80/20 mixture by weight of hexane/acetone was utilized.

TABLE III
SIMULTANEOUS FINE GRINDING, RESINOUS RUBBER
EXTRACTION OF GUAYULE SHRUB
HEXANE/ACETONE SOLVENT,
AMBIENT TEMPERATURE

| Sample No. | 9 | 10 |
|---|---|---|
| Shrub Wt. grams | 200.0 | 400.0 |
| Hexane/Acetone 80/20 by Wt., gram | | |
| Initial | 682 | 1705 |
| Final | 1905 | 2060 |
| Grinding Time in Blender Minutes | 2.5 | — |
| Wt. % Resinous Rubber Extracted[1] After Blender Grinding | 85.0 | — |
| Wt. % Resinous Rubber Extracted[2] After Mixing Sample with an Air Stirrer for Minutes: | | |
| 30 | 91.1 | 73.8 |
| 60 | — | 77.3 |

[1]Sample allowed to stand at least one hour prior to determination of resinous rubber in hexane/acetone solution.
[2]Sample No. 9 was mixed with an air stirrer for 30 minutes after grinding in the blender then allowed to stand over night prior to determination of resinous rubber in hexane/acetone solution.

Table III reveals that high resin and rubber extraction efficiencies were obtained utilizing the hexane-acetone solvent mixture.

Hence, the data has clearly demonstrated that high extraction efficiencies utilizing fine grinding of guayule shrubs in the presence of an extracting solvent is readily achieved within a matter of minutes. Increased rates of extraction can be achieved by using a properly designed high shear grinder mixer.

The extracted resin can be utilized for various items, such as for example, adhesive formulations, preparation of tackifying resins, etc., as well as a source of specific chemicals.

The extracted guayule rubber is similar to Hevea natural rubber. Hence, it can be utilized wherever natural or synthetic rubber is utilized, such as in tires, conveyor belts, etc., as well as other rubber articles.

While the best mode and preferred embodiments have been set forth in detail, it is to be understood that the invention is not limited thereto, the scope of the invention being limited by the scope of the attached claims.

What is claimed is:

1. A process for the fine grinding of rubber containing plants, comprising the steps of:
    preliminarily crushing the rubber containing plant;
    adding a monophase solvent to said crushed rubber containing plant and forming a slurry, said monophase solvent containing from about 50 to about 95 percent by weight of a hydrocarbon solvent and from about 5 to about 50 percent by weight of a polar solvent, said hydrocarbon solvent selected from the group consisting of an alkane having from 4 to 9 carbon atoms, a cycloalkane having from 5 to 10 carbon atoms, an aromatic or an alkyl substituted aromatic having from 6 to 12 carbon atoms, and combinations thereof, said polar solvent selected from the group consisting of a ketone having from 3 to 8 carbon atoms, an ester having from 3 to 8 carbon atoms, an alcohol having from 1 to 8 carbon atoms, an ether having from 2 to 8 carbon atoms, a cyclic ether having from 4 to 8 carbon atoms, and combinations thereof, and
    simultaneously fine grinding and extracting resin and said rubber from said slurry.

2. A process according to claim 1, wherein said grinding is a high shear grinding.

3. A process according to claim 2, wherein the amount of said monophase solvent to the amount of the plants is from about 100 to 1 by parts by weight.

4. A process according to claim 3, wherein said polar solvent is acetone, and wherein said hydrocarbon solvent is hexane.

5. A process according to claim 3, including extracting to an extent such that a recovery yield of at least 70 percent of the total resin and rubber in said plant is obtained.

6. A process according to claim 3, including the step of separating said resin and rubber from said slurry.

7. A process acording to claim 5, wherein the amount of said hydrocarbon solvent is from about 60 to about 90 percent by weight and wherein the amount of said polar solvents is from about 10 to about 40 percent by weight.

8. A process according to claim 7, wherein said polar solvent is acetone, and wherein said hydrocarbon solvent is hexane.

9. A process according to claim 3, including storing said slurry after grinding thereof.

10. A process according to claim 4, including storing said slurry after grinding thereof.

11. A process according to claim 7, wherein said rubber containing plant is selected from the group consisting of Parthenium Argentatum.

12. A process according to claim 7, wherein the said yield of rubber and resin is about 90 percent to about 100 percent.

13. A process according to claim 8, wherein said yield of rubber and resin is from about 90 percent to about 100 percent.

14. A process according to claim 10, wherein said yield of rubber and resin is from about 90 percent to about 100 percent.

15. A process according to claim 8, including the step of separating said resin and rubber from said slurry.

* * * * *